United States Patent
Takahashi

(10) Patent No.: US 7,603,150 B2
(45) Date of Patent: Oct. 13, 2009

(54) WIRELESS COMMUNICATION TERMINAL HAVING AN IMPEDANCE MATCHING CIRCUIT

(75) Inventor: Shin Takahashi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 160 days.

(21) Appl. No.: 11/252,985

(22) Filed: Oct. 17, 2005

(65) Prior Publication Data
US 2006/0105820 A1 May 18, 2006

(30) Foreign Application Priority Data
Oct. 21, 2004 (JP) ............................. 2004-306457

(51) Int. Cl.
H04M 1/00 (2006.01)
(52) U.S. Cl. ................ 455/575.3; 455/575.1
(58) Field of Classification Search ............. 455/575.7, 455/550.1, 572, 574, 575.1, 575.3, 575.4, 455/575.5; 370/318–320; 330/298
See application file for complete search history.

(56) References Cited

U.S. PATENT DOCUMENTS

| | | | |
|---|---|---|---|
| 6,885,353 B2 | 4/2005 | Kurihara | |
| 7,069,043 B2 * | 6/2006 | Sawamura et al. | 455/550.1 |
| 2002/0035692 A1 * | 3/2002 | Moriai | 713/189 |
| 2003/0008689 A1 | 1/2003 | Uda | |
| 2003/0148784 A1 | 8/2003 | Suwamura et al. | |
| 2004/0008151 A1 | 1/2004 | Kurihara | |
| 2004/0063476 A1 * | 4/2004 | Katagishi et al. | 445/575.7 |
| 2004/0106389 A1 * | 6/2004 | Chiou | 455/260 |
| 2004/0135635 A1 * | 7/2004 | Noro | 330/298 |

FOREIGN PATENT DOCUMENTS

| | | |
|---|---|---|
| CN | 1400842 A | 3/2003 |
| CN | 1512664 A | 7/2004 |
| EP | 1131898 B1 | 10/2002 |
| EP | 1324425 A1 | 7/2003 |
| GB | 2389463 B | 2/2006 |
| JP | 06112880 A | 4/1994 |

(Continued)

OTHER PUBLICATIONS

English language translation of Chinese language office action for corresponding Chinese application No. 200510116456.6 lists the reference above.

Primary Examiner—George Eng
Assistant Examiner—Michael Faragalla
(74) Attorney, Agent, or Firm—Hogan & Hartson LLP

(57) ABSTRACT

A wireless communication terminal able to suppress deterioration of antenna characteristics due to opening/closing of a terminal, that is, wireless communication terminal having, a first housing; a second housing connected so that both housings can be opened and closed with respect to each other; an antenna arranged in one housing of the first housing and second housing; an electric signal/audio converting portion arranged in the other housing of the first housing and second housing; and an audio processing unit for performing audio processing of the electric signal/audio converting portion, wherein the antenna is arranged facing the vicinity of the electric signal/audio converting portion when the first housing and second housing are in the closed state and is arranged away from the electric signal/audio converting portion when the housings are in the opened state, and a matching circuit for matching an impedance of the antenna is arranged between the audio processing unit and the electric signal/audio converting portion.

5 Claims, 17 Drawing Sheets

FOREIGN PATENT DOCUMENTS

| | | | |
|---|---|---|---|
| JP | 2000165124 A | 6/2000 | |
| JP | 2001-284934 | 10/2001 | |
| JP | 2001345882 A | 12/2001 | |
| JP | 2002368850 A | 12/2002 | |
| JP | 2003037415 A | 2/2003 | |
| JP | 2004015307 A | 1/2004 | |
| JP | 2004056426 A | 2/2004 | |
| KR | 2005077397 A | * | 8/2005 |
| WO | 0030267 A1 | 5/2000 | |

* cited by examiner

WIRELESS COMMUNICATION TERMINAL HAVING AN IMPEDANCE MATCHING CIRCUIT

CROSS REFERENCES TO RELATED APPLICATIONS

The present invention contains subject matter related to Japanese Patent Application No. 2004-306457 filed in the Japanese Patent Office on Oct. 21, 2004, the entire contents of which being incorporated herein by reference.

BACKGROUND OF THE INVENTION

1. Field of Invention

The present invention relates to a wireless communication terminal such as a mobile phone, more particularly relates to a wireless communication terminal having two housings connected so that they can be opened and closed with respect to each other and having a built-in antenna in one housing.

2. Description of the Related Art

In recent years, portable wireless communication terminal such as mobile phones and PDAs having a wireless function provided with a first housing, a second housing, and a hinge pivotally connecting the first housing and the second housing and configured so that the two housings can be opened and closed have become popular.

Now, however, smart designs are now being demanded from wireless communication terminals. A wireless communication terminal arranging the antenna in the first housing or the second housing forming part of the terminal in place of an antenna sticking outside of the housing as in the past has been proposed (see for example Japanese Unexamined Patent Publication (Kokai) No. 2001-284934). The wireless communication terminal disclosed in Japanese Unexamined Patent Publication (Kokai) No. 2001-284934 is a fold up type which has a built-in antenna in the hinge.

In the wireless communication terminal disclosed in Japanese Unexamined Patent Publication (Kokai) No. 2001-284934, use is made of a flexible circuit board and interconnects for electrically connecting the circuit boards etc. arranged in two housings. These are inserted into the hinge. Therefore, there is the disadvantage that it is difficult to arrange the antenna there in terms of space. Further, the flexible circuit board and the interconnects would be near the antenna, therefore they would be liable to have an adverse effect on the antenna characteristics.

Therefore, a wireless communication terminal arranging a built-in antenna in an end of the housing has been proposed. However, in a wireless communication terminal such as mobile phone, the positional relationship between the antenna provided in one housing and the other housing changes according to the opening/closing of the terminal, therefore the antenna characteristics would change between the opened state and the closed state.

The antenna used in a mobile phone etc. is adjusted in its resistance so as to become 50Ω. If the built-in antenna is arranged in the end of the housing, when the first housing and the second housing are in the closed state, the antenna would be arranged facing the vicinity of a speaker or microphone arranged in the end of the other housing, while when the housings are in the opened state, the antenna would be arranged far from the speaker or microphone. Therefore, the impedance characteristic would change between the closed state and the opened state, so there would be the disadvantage of a deterioration in the reception characteristics.

SUMMARY OF THE INVENTION

An object of the present invention is to provide a wireless communication terminal able to suppress deterioration in the antenna characteristics due to the opening/closing of a terminal.

According to a first aspect of the present invention, there is provided a wireless communication terminal having, a first housing; a second housing connected so that the housing can be opened and closed with respect to each other; an antenna arranged in one housing of the first housing and second housing; an electric signal/audio converting portion arranged in the other housing of the first housing and second housing; and an audio processing unit for performing audio processing of the electric signal/audio converting portion; wherein the antenna is arranged facing the vicinity of the electric signal/audio converting portion when the first housing and second housing are in the closed state and is arranged away from the electric signal/audio converting portion when the housing are in the opened state, and a matching circuit for matching an impedance of the antenna is arranged between the audio processing unit and the electric signal/audio converting portion.

Preferably, the terminal further has an open/close detection unit for detecting whether the first housing and second housing are in the opened state or the closed state, a first signal line connected to the electric signal/audio converting portion and having the reactance element arranged therein, a second signal line connected to the electric signal/audio converting portion and not having a reactance element arranged therein, and a switch unit for switching a signal line connected to the audio processing unit between the first signal line and the second signal line, and the switch unit switches the signal line based on detection results of the opening/closing detection unit.

Preferably, the reactance element is included in a portion of a matching circuit.

Preferably, the matching circuit is set so as to operate when the first housing and second housing are in the closed state.

Preferably, the matching circuit is set so as to operate with respect to a communication use frequency bandwidth and not operate with respect to an audio frequency bandwidth.

According to a second aspect of the present invention, there is provided a wireless communication terminal having, a first housing; a second housing connected so that the housings can be opened and closed with respect to each other; an antenna arranged in one housing between the first housing and second housing; an electric signal/audio converting portion arranged in the other housing between the first housing and second housing; an audio processing unit for performing audio processing of the electric signal/audio converting portion; an open/close detection unit for detecting whether the first housing and second housing are in the opened state or the closed state; a signal line able to connect the audio processing unit and the electric signal/audio converting portion; and a switch unit for connecting the audio processing unit and the electric signal/audio converting portion by the signal line when the result of the detection of the open/close detection unit is that the housings are in the opened state and electrically disconnecting the audio processing unit and the electric signal/audio converting portion when the result is that the housings are in the closed state, the antenna being arranged facing the vicinity of the electric signal/audio converting portion when the first housing and second housing are in the closed state and being arranged away from the electric signal/audio converting portion when the housings are in the opened state.

According to the present invention, deterioration of the antenna characteristics due to the opening/closing of the terminal can be suppressed.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an explanation will be given of embodiments of the present invention with reference to the attached drawings.

Figure 1:
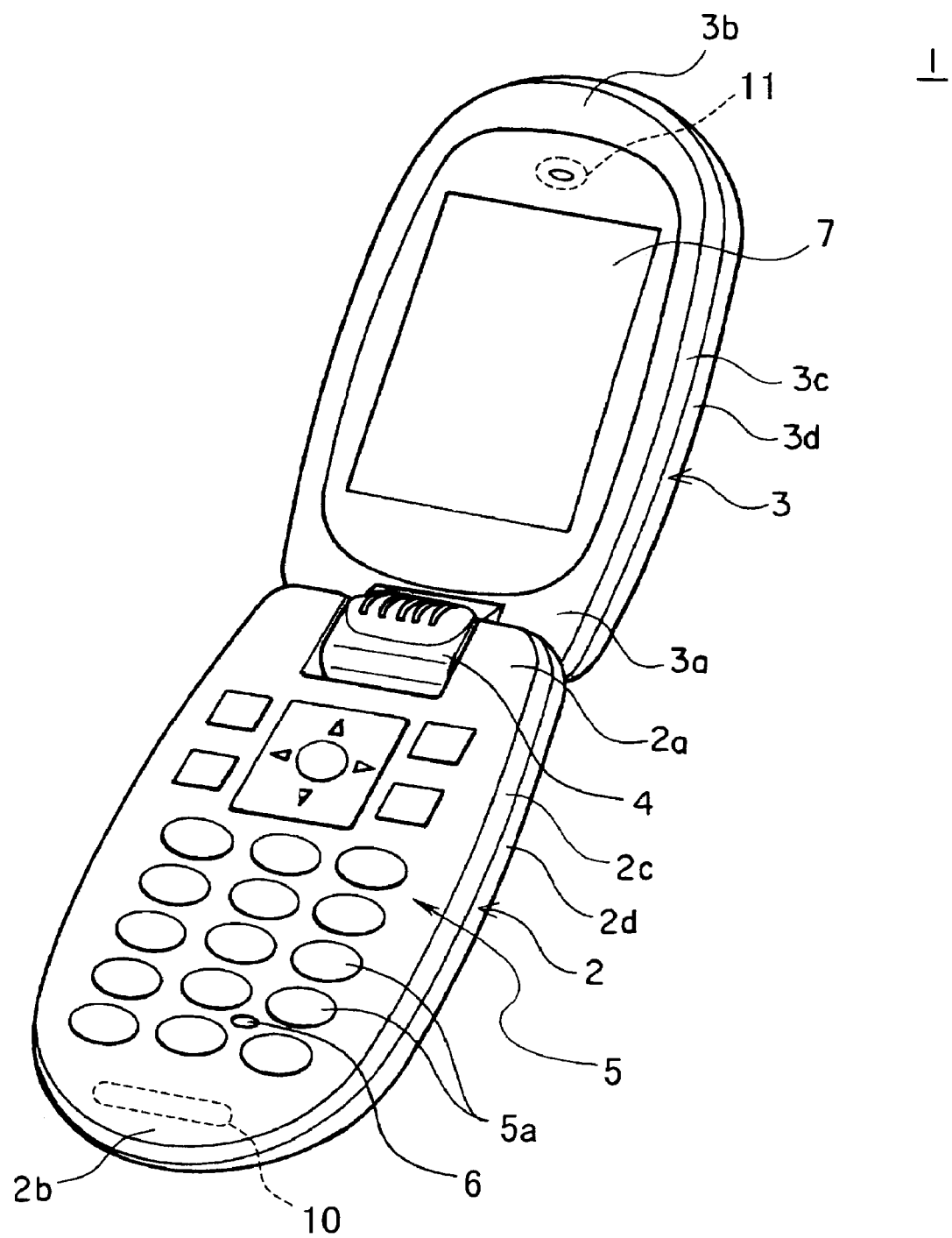
FIG. 1 is a perspective view of an outer appearance showing an opened state of a mobile phone to which the present invention is applied.
Figure 2:
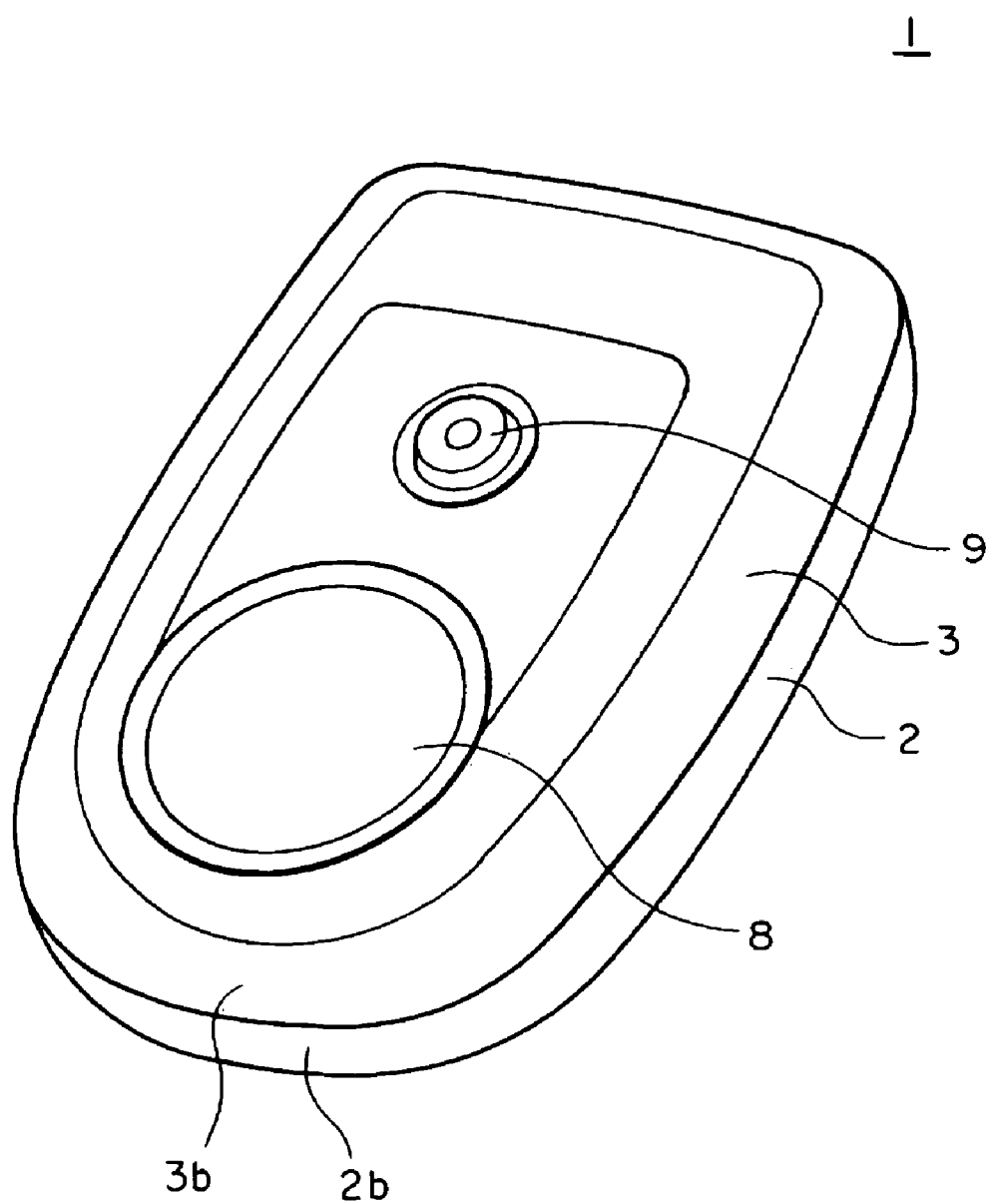
FIG. 2 is a perspective view of an outer appearance showing a closed state of a mobile phone to which the present invention is applied.

FIG. 1 and FIG. 2 are perspective views of outer appearance showing an embodiment of a mobile phone constituting a wireless communication terminal of the present invention. FIG. 1 shows an opened state, and FIG. 2 shows a closed state.

A mobile phone 1 is provided with a first housing 2 and a second housing 3 and is configured so that the housings can be opened and closed by pivotally connecting an end 2a of the first housing 2 and an end 3a of the second housing 3 by a hinge portion 4.

The first housing 2 and the second housing 3 are provided with front surface cases 2c and 3c at surfaces (front surfaces) facing each other in the closed state and back surface cases 2d and 3d on their back surfaces. These front surface cases 2c and 3c are formed so that the contours of the surfaces facing each other when viewed from one housing to the other housing in the closed state substantially coincide. The positions of the ends 2b and 3b on the opposite sides (opening/closing sides) to the sides of connection between the first housing 2 and the second housing 3 match with each other in the closed state.

The first housing 2 is provided with an operation unit 5 on its front surface. In the operation unit 5, various types of buttons for operating the mobile phone 1 such as tenkeys 5a are arranged. Further, the front surface is provided with an opening 6 for collecting sound at the region of the tenkeys 5a. Note that, the opening 6 may be provided with a protective film for the purpose of preventing intrusion of dust into the first housing 2.

The second housing 3 is provided along its front surface with a main display unit (first display unit) 7 for displaying an image on its front surface. The second housing 3 is provided along its back surface with a sub display unit (second display unit) 8 for displaying an image on its back surface. An opening window is formed circularly on the back surface case 3d for exposing the sub display unit 8. The main display unit 7 and the sub display unit 8 are configured by for example transmission type or reflection type LCDs. Note that, as the displays, use may be made of organic ELs and other devices as well.

Further, the back surface of the second housing 3 is provided with a pushbutton (pressing member) 9 for controlling the operation of the sub display unit 8. The pushbutton 9 is constituted by for example a plastic or hard rubber and arranged of the back surface case 3d so to be moveable in a vertical direction with respect to the plane of arrangement of the sub display unit 8.

In the mobile phone 1 of the present embodiment configured so that opening and closing are possible by pivotally connecting the end 2a of the first housing 2 and the end 3a of the second housing 3 by the hinge portion 4 in this way, as will be explained in detail later, a built-in transmission/reception antenna 10 is provided at the inside at the end 2b side of the first housing 2. Further, a built-in speaker 11 (or microphone) constituting the electric signal/audio converting portion is provided in the end 3b of the second housing.

In the present embodiment, the explanation will be given assuming that the built-in electric signal/audio converting portion in the end 3b of the second housing is the speaker 11.

This being the case, in the present embodiment, when the first housing 2 and the second housing 3 are in the closed state, the antenna 10 is arranged facing the vicinity of the speaker 11 constituting the electric signal/audio converting portion arranged in the end 3b of the second housing 3, while when they are in the opened state, the antenna 10 is arranged away from the speaker 11.

For this reason, in the mobile phone 1 of the present embodiment, in order to prevent a change of the impedance characteristic between the closed state and the opened state and deterioration of the reception characteristics, deterioration of the antenna characteristics due to the opening/closing of the terminal is suppressed by for example arranging a matching circuit including a reactance element between the audio processing unit and the speaker 11, disconnecting the speaker 11 in a high frequency manner when the housings are closed, or applying other measures in terms of the electric circuit.

Further, the mobile phone 1 of the present embodiment is structured to enable a reduction of the amount of change of the antenna characteristics due to the opening/closing of the terminal.

Below, an explanation will be given of measures in the electric circuit for suppressing deterioration of the antenna characteristics due to the opening/closing of the terminal and the structural countermeasure for reducing the amount of change of the antenna characteristics due to the opening/closing of the terminal in the present embodiment with reference to the drawings.

First, an explanation will be given of the measures in the electric circuit.

Figure 3:
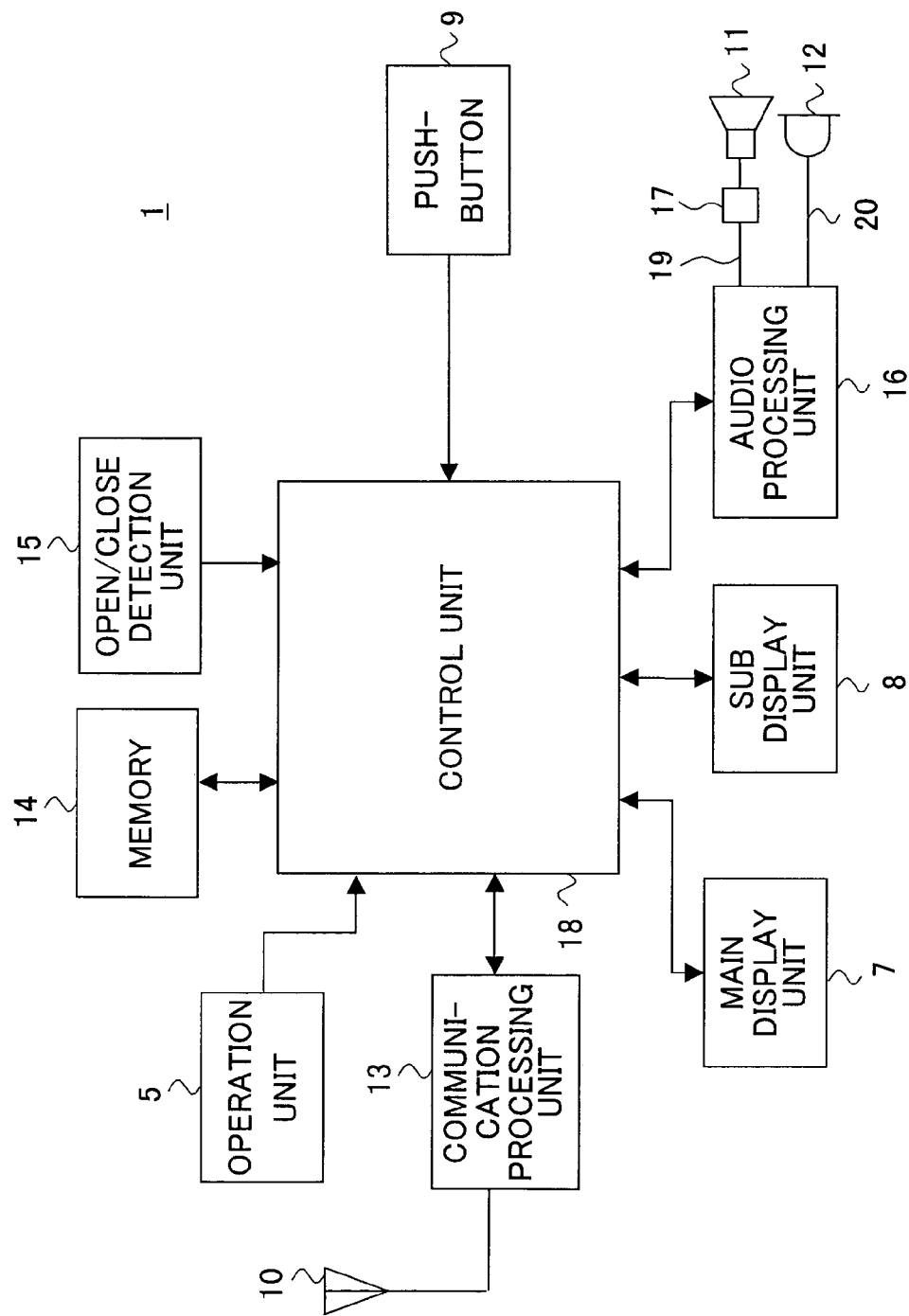
FIG. 3 is a block diagram of a first example of the configuration of a signal processing system of a mobile phone as constituting a wireless communication terminal of the present invention.

FIG. 3 is a block diagram of a first example of the configuration of a signal processing system of a mobile phone constituting a wireless communication terminal of the present invention.

The mobile phone 1 of FIG. 3 has, as principal components, the above-explained operation unit 5, main display unit 7, sub display unit 8, pushbutton 9, antenna 10, speaker 11, and microphone 12 and, in addition, a communication processing unit 13, a memory 14, an open/close detection unit 15, an audio processing unit 16, a matching circuit 17, and a control unit 18.

The communication processing unit 13 performs a wireless communication operation via a not shown base station, for example, a calling operation of a call number, and a transmission/reception operation of e-mail. The communication processing unit 13 includes a high frequency circuit which modulates the audio information, e-mail, etc. processed in the control unit 18 and transmits the same to a not shown base station by the antenna 10 for wireless communication utilizing radio waves. Further, the communication processing unit 13 demodulates various information such as e-mail and audio information transmitted from the base station and received at the antenna 10 and outputs the same to the control unit 18. Note that, the antenna 10 is built in the end 2b of the first housing 2 and not exposed to the outside.

The memory 14 includes a non-volatile memory such as an EEPROM and stores a control program for transmitting and receiving audio and e-mail, an Internet browser, message data, and address book registering names, telephone numbers, etc.

The open/close detection unit 15 has a switch for detecting the opened/closed state of the mobile phone 1. As to the specific configuration of the open/close detection unit 15, various techniques can be applied. For example, it may be configured as a switch outputting an ON signal to the control unit 18 when an angle formed by the first housing 2 and the second housing 3 becomes a predetermined degree or more.

The audio processing unit 16 has an audio processing circuit to which a speaker 11 for outputting audio for the speech function and a microphone 12 for the audio input are connected by signal lines 19 and 20. The audio processing unit 16 performs predetermined processing with respect to the audio collected by the microphone 12 and supplies the same to the control unit 18 through the signal line 20. Further, the audio processing unit 16 performs predetermined processing with respect to the audio information supplied from the control unit 18 and makes the speaker 11 output it through the signal line 19.

The matching circuit 17 includes a reactance element and is inserted in the signal line 19 connecting the audio processing unit 16 and the speaker 11.

Figure 4:
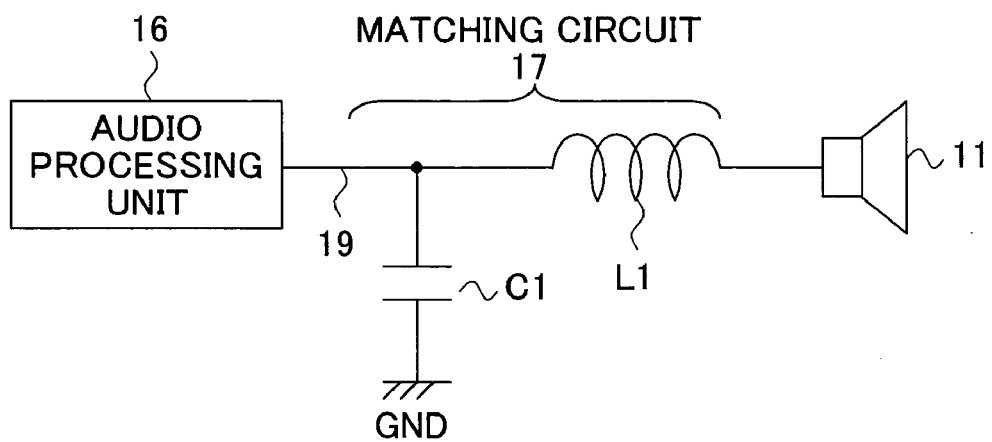
FIG. 4 is a circuit diagram of an example of the configuration of a matching circuit of the present embodiment.

FIG. 4 is a circuit diagram of an example of the configuration of the matching circuit. The matching circuit 17 of FIG. 4 is configured by a coil (inductor) L1 inserted in the signal line 19 and a capacitor C1 connected between one end on the connection side of the coil L1 with the audio processing unit 16 and the ground GND and is formed as a so-called "antenna matching circuit". In this matching circuit 17, constants of the coil L1 and the capacitor C1 are set at values resulting in impedance matching of the antenna 10 in the closed state (folded-up state) of the first housing 2 and the second housing 3. Namely, the constants are set at values so that the matching circuit 17 operates as a matching circuit in the communication use frequency bandwidth, for example, a high frequency band of 800 MHz etc., but does not operate much in the audio frequency bandwidth, for example about 300 Hz to 3000 Hz. For example, an inductance of the coil L1 is set at about 1 to 10 nH, and a capacitance of the capacitor C1 is set at about 1 to 100 pF. In the matching circuit 17 having such a configuration, the coil L1 only exhibits minute resistance in the audio frequency bandwidth (about 300 Hz to 3000 Hz). Further, the capacitor C1 does not act at all as a filter unless the capacitance becomes 1 μF or more.

In this way, in the mobile phone 1 of FIG. 3, since the signal line 19 connecting the audio processing unit 16 and the speaker 11 is connected to the matching circuit 17 configured by the coil L1 and the capacitor C1 and the constants of the coil L1 and the capacitor C1 are set at values resulting in matching when the first housing 2 and the second housing 3 are in the closed state (folded-up state), it becomes possible to suppress deterioration of the antenna characteristics due to the speaker 11 when the antenna 10 is arranged facing the vicinity of the speaker 11 constituting the electric signal/ audio converting portion due to folding up the first housing 2 and the second housing 3.

Note that the case where the matching circuit 17 was configured by a coil L1 and a capacitor C1 was explained, but it is also possible to configure the same by only a resistor element.

Figure 5:
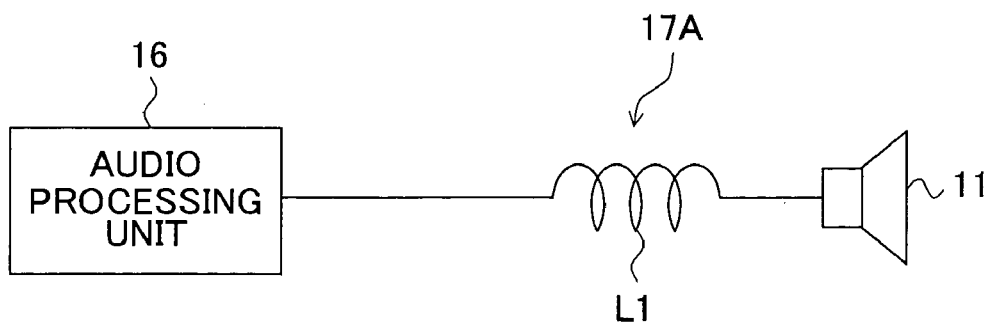
FIG. 5 is a circuit diagram of another example of the configuration of a matching circuit of the present embodiment.

Further, as shown in FIG. 5, it is also possible to configure the matching circuit 17 by only a coil L1 having an inductance of tens of nH or more. When using a coil L1 having an inductance of tens of nH or more as in the matching circuit 17A of FIG. 5, in the high frequency band, the resistance component becomes large and the speaker 11 can be disconnected. By separating the speaker 11 from the ground GND in terms of high frequency in this way, when the first housing 2 and the second housing 3 are folded up, the ground potential GND no longer approaches the antenna 11, so it becomes possible to suppress deterioration of the antenna characteristics.

Figure 6:
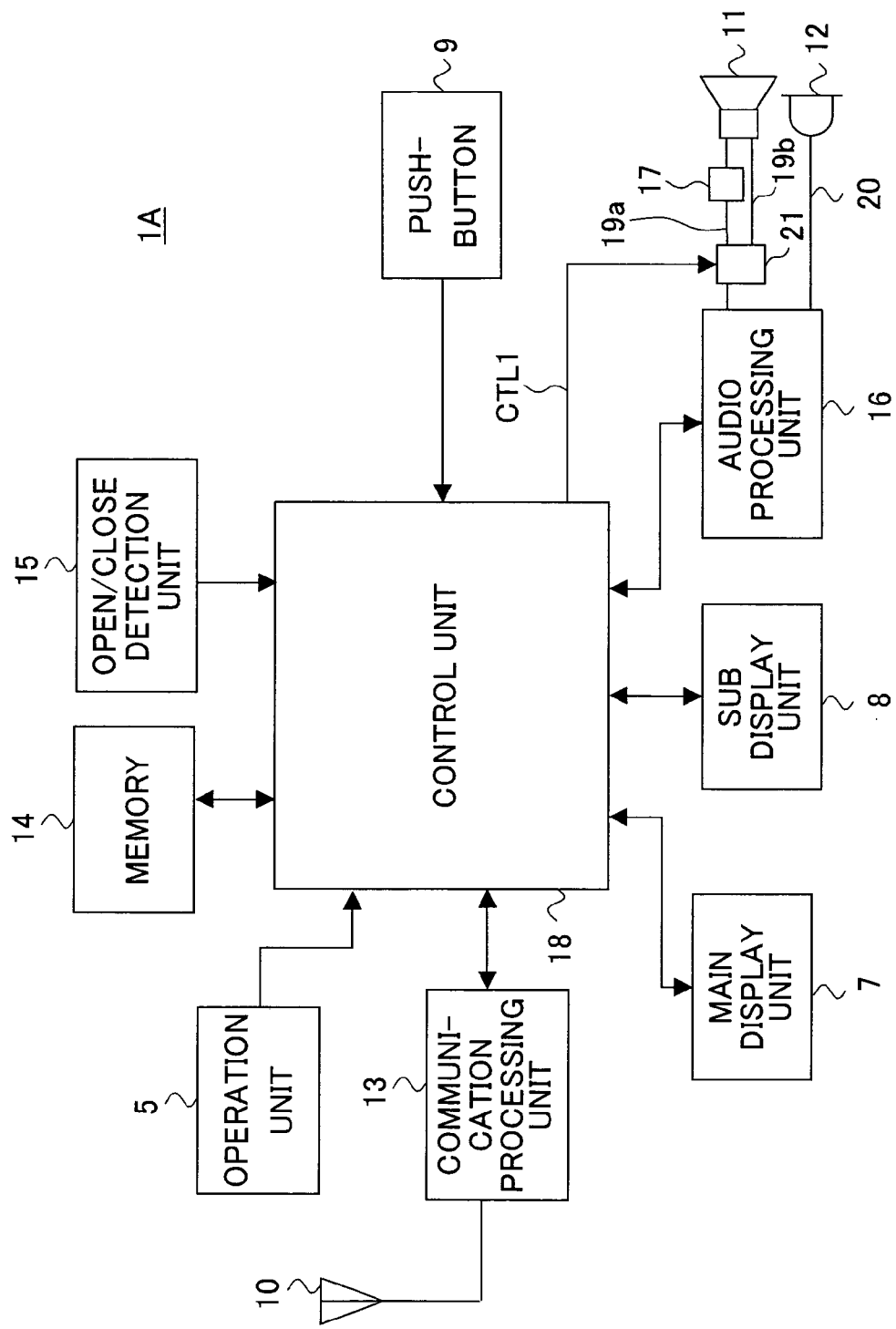
FIG. 6 is a block diagram of a second example of the configuration of a signal processing system of a mobile phone constituting a wireless communication terminal of the present invention.

FIG. 6 is a block diagram of a second example of the configuration of a signal processing system of a mobile phone constituting a wireless communication terminal of the present invention.

The difference of a mobile phone 1A of FIG. 6 from the mobile phone 1 of FIG. 3 resides in that the signal line 19 connecting the speaker 11 is separated to a first signal line 19a in which the matching circuit 17 is arranged and a second signal line 19b in which no matching circuit is arranged, and the connection of these first signal line 19a and second signal line 19b and the audio processing unit 16 is switched by a switch unit 21 based on the detection results of the open/close detection unit 15.

Figure 7:
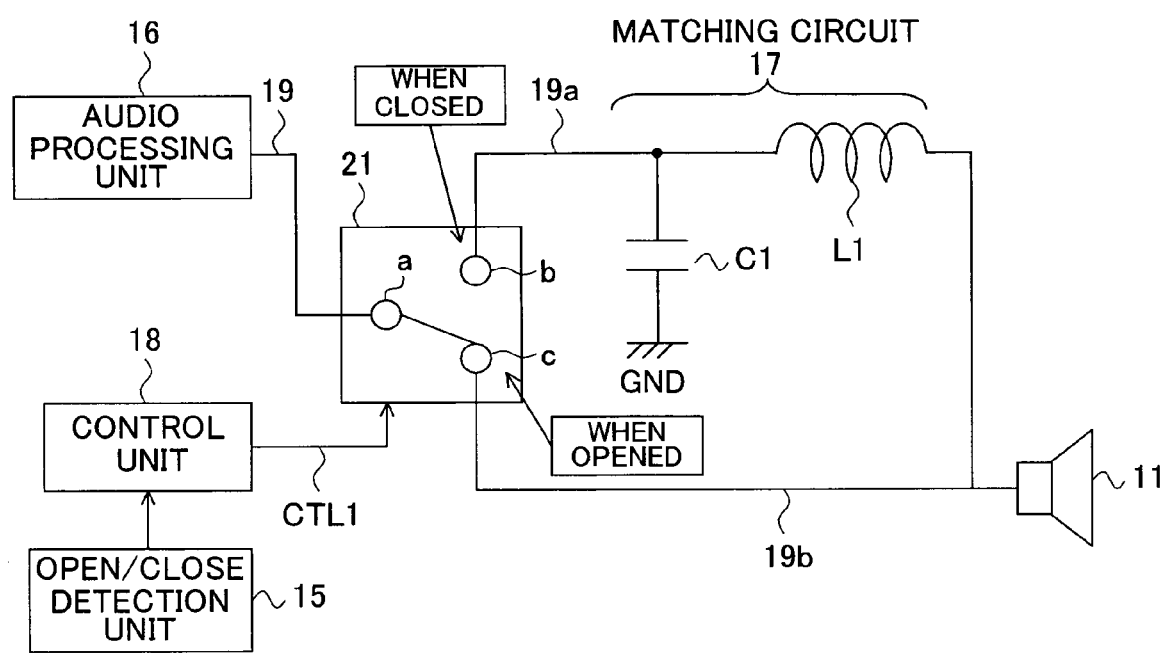
FIG. 7 is a circuit diagram of the specific configuration between an audio processing unit including a switch unit and a speaker in FIG. 6.

FIG. 7 is a circuit diagram of a specific configuration between the audio processing unit including the switch unit in FIG. 6 and the speaker.

The switch unit 21 is connected at its fixed contact a to the output line 19 of the audio processing unit 16, connected at its movable contact b to one end of the first signal line 19a, and connected at its movable contact c to one end of the second signal line 19b. The switch unit 21 switches the connection of the fixed contact a and the movable contact b or c based on a control signal CTL1 from the control unit 18. Specifically, when the open/close detection unit 15 detects the closed state, the control unit 18 performs the switching control so as to connect the fixed contact a of the switch unit 21 to the movable contact b and connect the audio processing unit 16 and the speaker 11 by the first signal line 19a via the matching circuit 17. On the other hand, when the open/close detection unit 15 detects the opened state, the control unit 18 performs the switching control so as to connect the fixed contact a of the switch unit 21 to the movable contact c and connect the audio processing unit 16 and the speaker 11 by the second signal line 19b not via the matching circuit 17.

Usually, a switch used at high frequency can pass a signal in the audio frequency bandwidth. Accordingly, as shown in FIG. 6 and FIG. 7, the high frequency switch unit 21 is used and the connection is switched so that the audio processing unit 16 is directly connected to the speaker 11 without going through the matching circuit 17 when the housings are opened and so that the audio processing unit 16 is connected to the speaker 11 through the matching circuit 17 when the housings are closed.

As explained above, in the matching circuit 17, the constants are adjusted (set) so that the antenna characteristics become optimum when the first housing 2 and the second housing 3 are in the closed state. Therefore, in the same way as the case of FIG. 3, it becomes possible to suppress deterioration of the antenna characteristics due to the speaker 11 when the first housing 2 and the second housing 3 are folded up and the antenna 10 is arranged facing the vicinity of the speaker 11 constituting the electric signal/audio converting portion. Note that, the matching circuit 17 can be formed by a different path from the audio by the switch unit 21, therefore the degree of freedom is higher in the configuration of FIG. 5 than the configuration of FIG. 3.

Note that, in FIG. 6 and FIG. 7, the configuration was made so that the the switch unit 21 was controlled through the control unit 18, but it is also possible to configure the same so that the switching is directly controlled based on the detection signal of the open/close detection unit 15. The same effect can be obtained also in this case.

Figure 8:
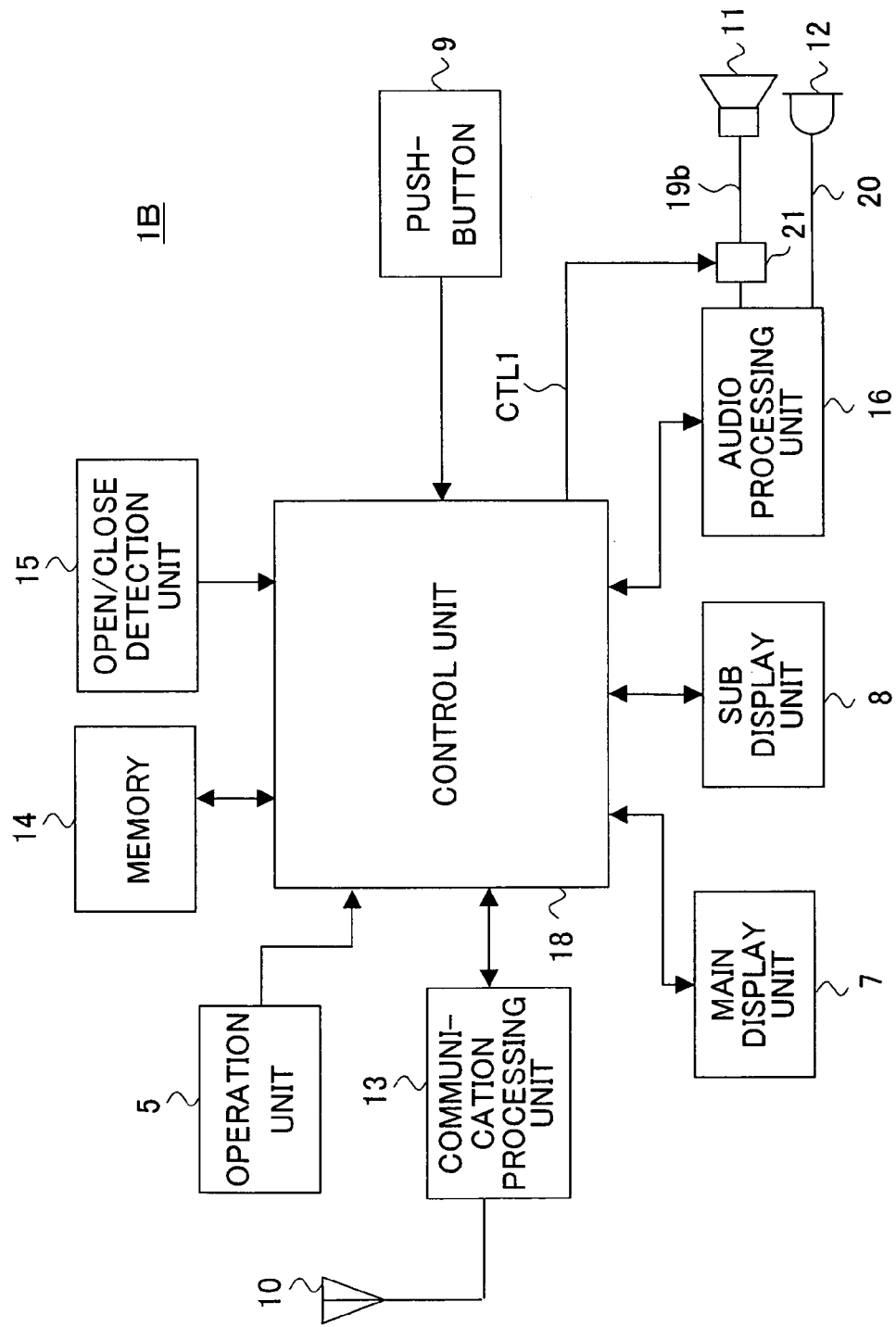
FIG. 8 is a block diagram of a third example of the configuration of a signal processing system of a mobile phone constituting a wireless communication terminal of the present invention.
Figure 9:
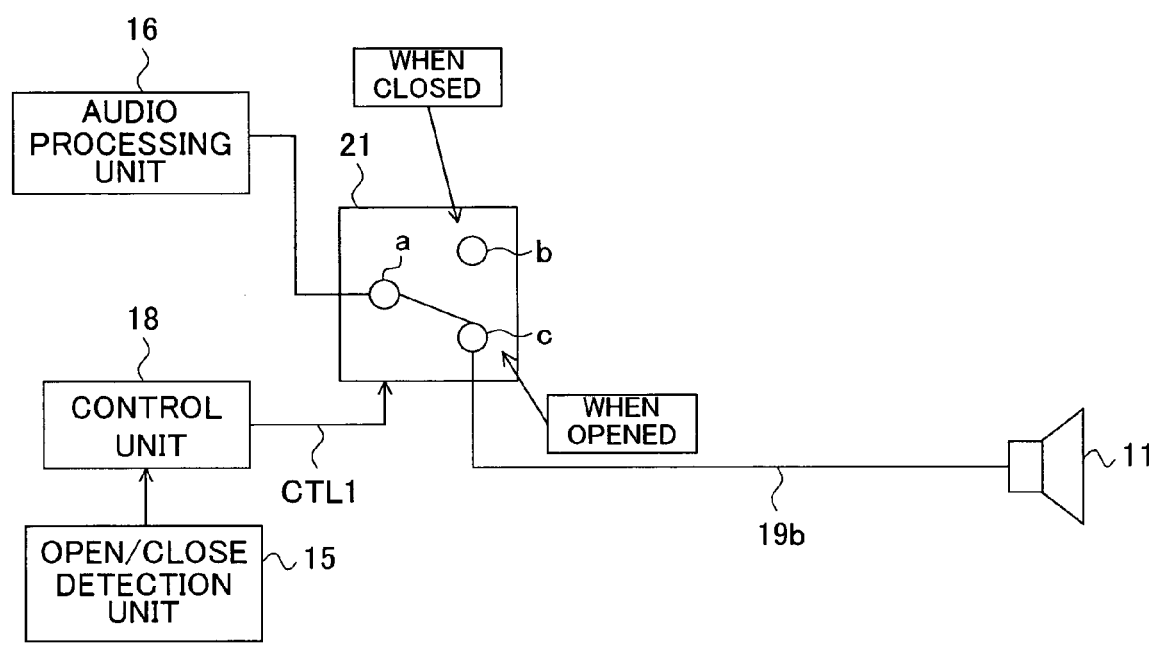
FIG. 9 is a circuit diagram of a specific configuration between the audio processing unit including the switch unit and the speaker in FIG. 8.

FIG. 8 is a block diagram of a third example of the configuration of a signal processing system of a mobile phone constituting a wireless communication terminal of the present invention. FIG. 9 is a circuit diagram of a specific configuration between an audio processing unit including the switch unit and the speaker in FIG. 8.

The difference of the mobile phone 1B of FIG. 8 from the mobile phone 1A of FIG. 6 resides in that an open state in which nothing is connected to the movable contact b of the switch unit 21 is exhibited without using the first signal line 19a to which the matching circuit 17 is connected. The control per se of the control unit 18 is the same as the case of FIG. 6 and FIG. 7.

Namely, when the open/close detection unit 15 detects the closed state, the control unit 18 controls the switching so as to connect the fixed contact a of the switch unit 21 to the movable contact b and disconnect the audio processing unit 16 and the speaker 11. On the other hand, when the open/close detection unit 15 detects the opened state, the control unit 18 controls the switching so as to connect the fixed contact a of the switch unit 21 to the movable contact c and connect the audio processing unit 16 and the speaker 11 by the second signal line 19b not via the matching circuit 17.

Usually, a switch used at high frequency can pass a signal in the audio frequency bandwidth. Accordingly, as shown in FIG. 8 and FIG. 9, use is made of a high frequency switch unit 21, and the connection is switched so that the audio processing unit 16 is directly connected to the speaker 11 without going through the matching circuit 17 when the housings are opened and so that the speaker 11 is disconnected (separated) when the housings are closed. By disconnecting the speaker 11 from the signal line, when the first housing 2 and the second housing 3 are closed (folded up), the ground potential GND no longer approaches the antenna 11, and it becomes possible to suppress deterioration of the antenna characteristics. When using the speaker 11 only for reception, basically, in the closed state, no audio is output from the speaker 11, therefore there is no problem even when they are completely separated.

As described above, by employing the circuit configurations of FIG. 3 and FIG. 4 and of FIG. 6 and FIG. 7, it becomes possible to suppress deterioration of the characteristics of the antenna 10 when the first housing 2 and the second housing 3 are closed (folded up). It becomes possible to separately match the antenna characteristics when the first housing 2 and the second housing 3 are closed (folded up).

Further, by employing the circuit configurations of FIG. 3 and FIG. 5 and of FIG. 8 and FIG. 9, it becomes possible to suppress deterioration of the characteristics of the antenna 10 when the first housing 2 and the second housing 3 are closed (folded up).

This completes the explanation of the measures in the electric circuit for suppressing deterioration of the antenna characteristics due to the opening/closing of the terminal in a mobile phone of the present embodiment. Below, an explanation will be given of the structural measures for reducing the amount of change of the antenna characteristics due to the opening/closing of the terminal with reference to the drawings.

Figure 10:
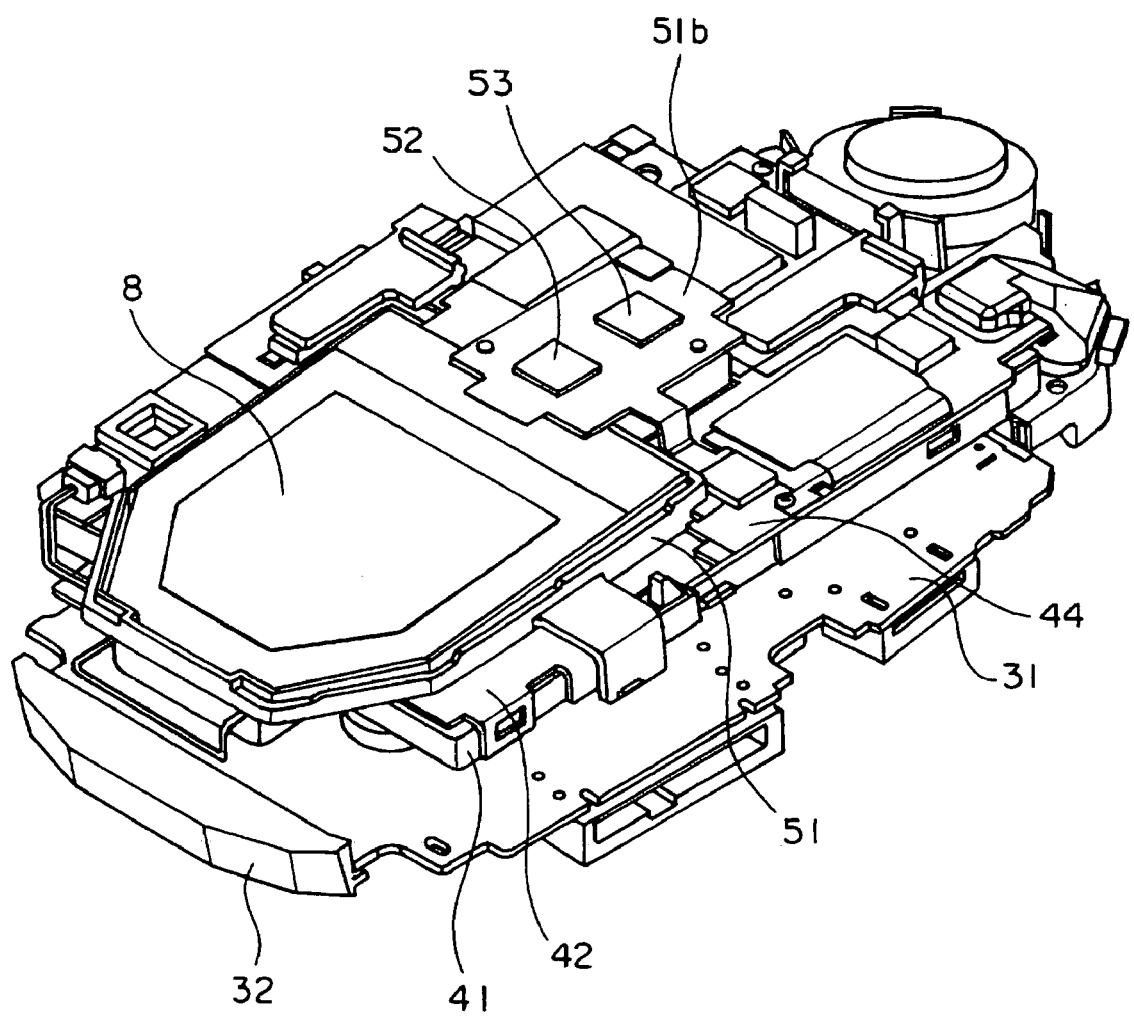
FIG. 10 is a perspective view of an internal configuration of a mobile phone of the present embodiment in the closed state.
Figure 11:
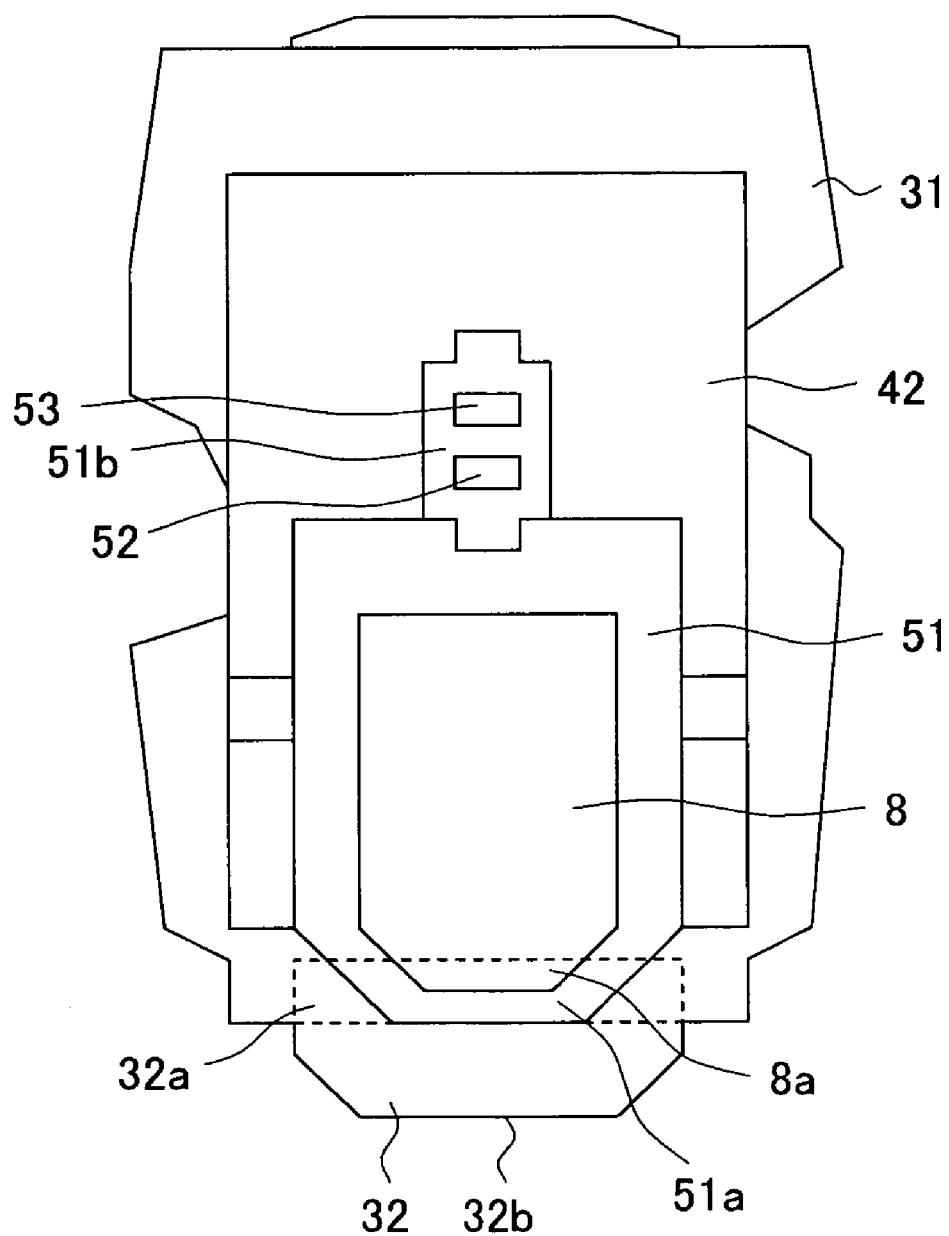
FIG. 11 is a plan view of the internal configuration of a mobile phone of the present embodiment in the closed state.

FIG. 10 and FIG. 11 are a perspective view and a plan view of the internal configuration of the mobile phone 1 in the closed state. Note that, both of FIG. 10 and FIG. 11 are shown while omitting part of the components.

The first housing 2 is provided inside it with a circuit board 31 on which high frequency circuits and other various types of circuits are arranged and an antenna unit 32 including the transmission/reception antenna 10 for transmitting and receiving the radio waves. The antenna unit 32 is provided in the end of the circuit board 31 and located inside the end 2b of the first housing 2.

The second housing 3 is provided inside it with a main display unit holder 41 holding the periphery and the back surface of the main display unit 7, a main display unit frame 42 provided along the back surface of the main display unit holder 41 and reinforcing the main display unit 7 and the main display unit holder 41 in terms of structural strength, and a sub display unit holder 51 holding the periphery and the back surface of the sub display unit 8. The main display unit holder 41 and the sub display unit holder 51 are made of for example a nonconductive plastic, while the main display unit frame 42 is made of for example a metal. Note that the base against which the back surface of the first display unit abuts is constituted by the main display unit holder 41 and the main display unit frame 42.

As shown in FIG. 11, the main display unit 7, the main display unit holder 41, and the main display unit frame 42 are provided at positions not overlapping the antenna unit 32 in the closed state. In the sub display unit 8 and the sub display unit holder 51, ends 8a and 51a on the opening/closing side thereof are provided at positions overlapping the end 32a on the housing connection side of the antenna unit 32 in the closed state. Note that the sub display holder 51 holds the sub display unit 8 even at a position that overlaps the antenna unit 32.

In the sub display unit 8 and the sub display holder 51, the ends 8a and 51a on the opening/closing side are rounded when seen from the back surface of the second housing, while the antenna unit 32 is formed so that the end 32b on the opening/closing side (facing the outside of the first housing when seen from the back surface) forms an arc surrounding the ends 8a and 51a of the sub display unit 8a and the sub display unit holder 51. Note that details of the antenna unit will be explained later.

The housing connection side of the sub display unit holder 51 is provided with a tongue piece 51b protruding to the housing connection side. The tongue piece 51b (back surface of the second housing 3) is provided on it with a drive unit 52 for predetermined control such as power supply control of the sub display unit 8 and a depression switch 53 connected to the drive unit 52 and opened/closed in its contact in accordance with the depression operation. The drive unit 52 is configured by for example an IC. On the depression switch 53, the pushbutton 9 is arranged. The pushing operation of the pushbutton 9 depresses the depression switch 53.

Figure 12:
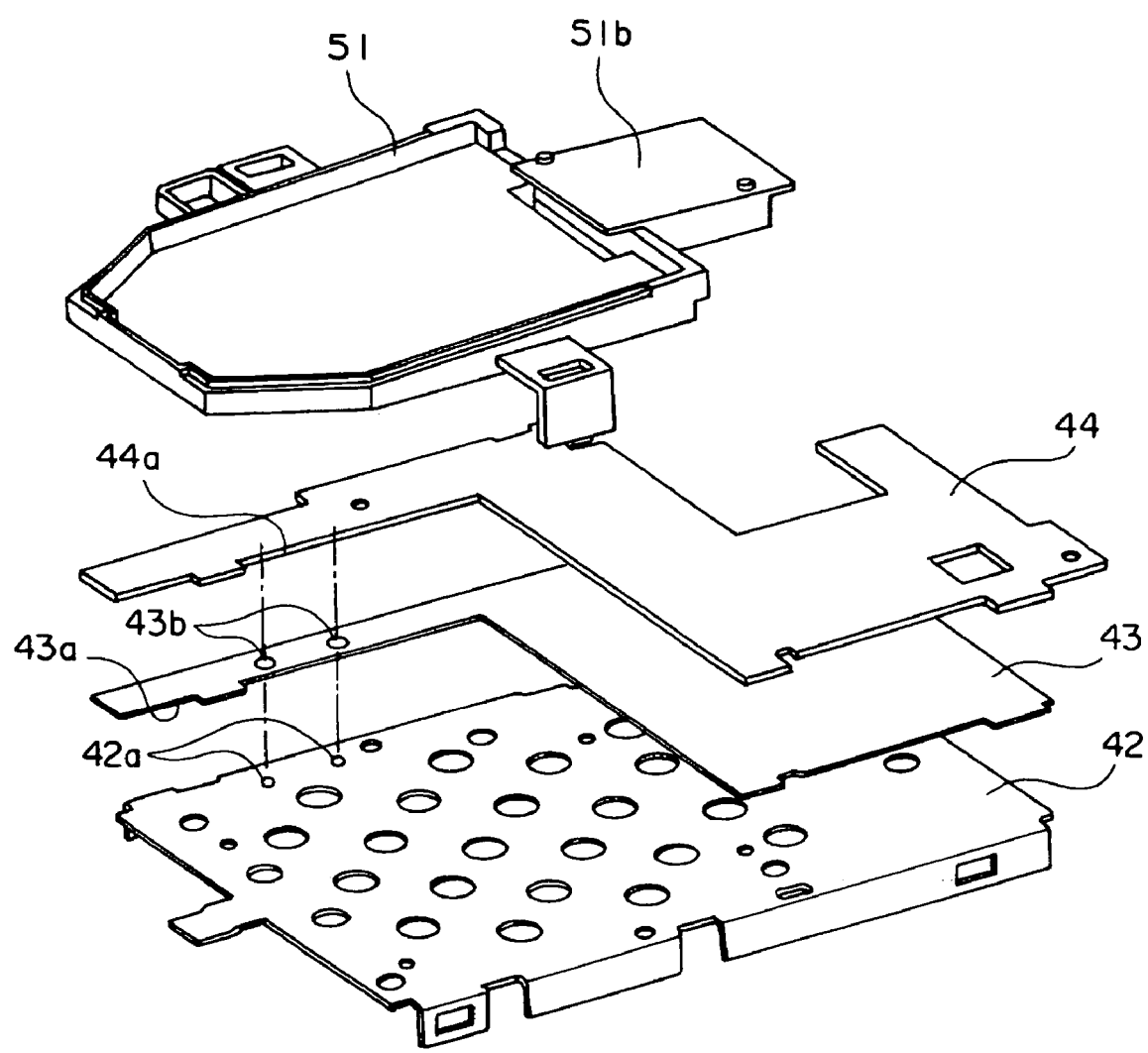
FIG. 12 is a disassembled perspective view of the configuration of the inside of a second housing of the mobile phone of the present embodiment.

FIG. 12 is a disassembled perspective view of a portion of the internal configuration of the second housing 3. As shown also in FIG. 12, the back surface of the main display unit frame 42 is provided with an insulation sheet 43 and a circuit board 44 for predetermined control such as power supply control of the main display unit 7. The insulation sheet 43 and the circuit board 44 are provided with recesses 43a and 44a on the opening/closing side. The sub display unit holder 51 is arranged so that a half or more of its back surface abuts against the back surface of the main display unit frame 42 via the spaces formed by these recesses. Note that the abutting back surfaces may be joined with each other by double-sided tape or another joining member. Further, the abutting back surfaces may not be joined with each other.

The main display frame 42 is provided with a projection 42a at the sideward position against which the sub display unit holder 51 abuts. By the contact of the projection 42a with the circuit board 44 via holes 43b of the insulation sheet 43, the circuit board 44 is made electrically conductive.

Figure 13:
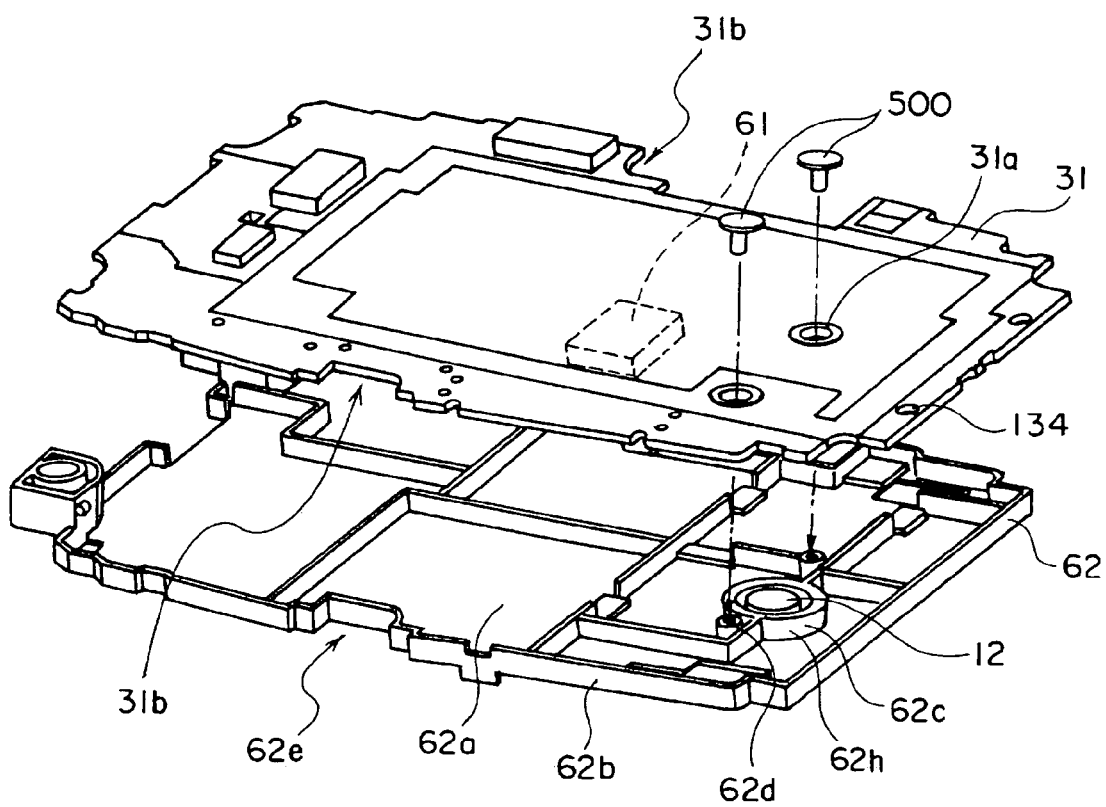
FIG. 13 is a disassembled perspective view of the configuration of the inside of a first housing of the mobile phone of the present embodiment.
Figure 14:
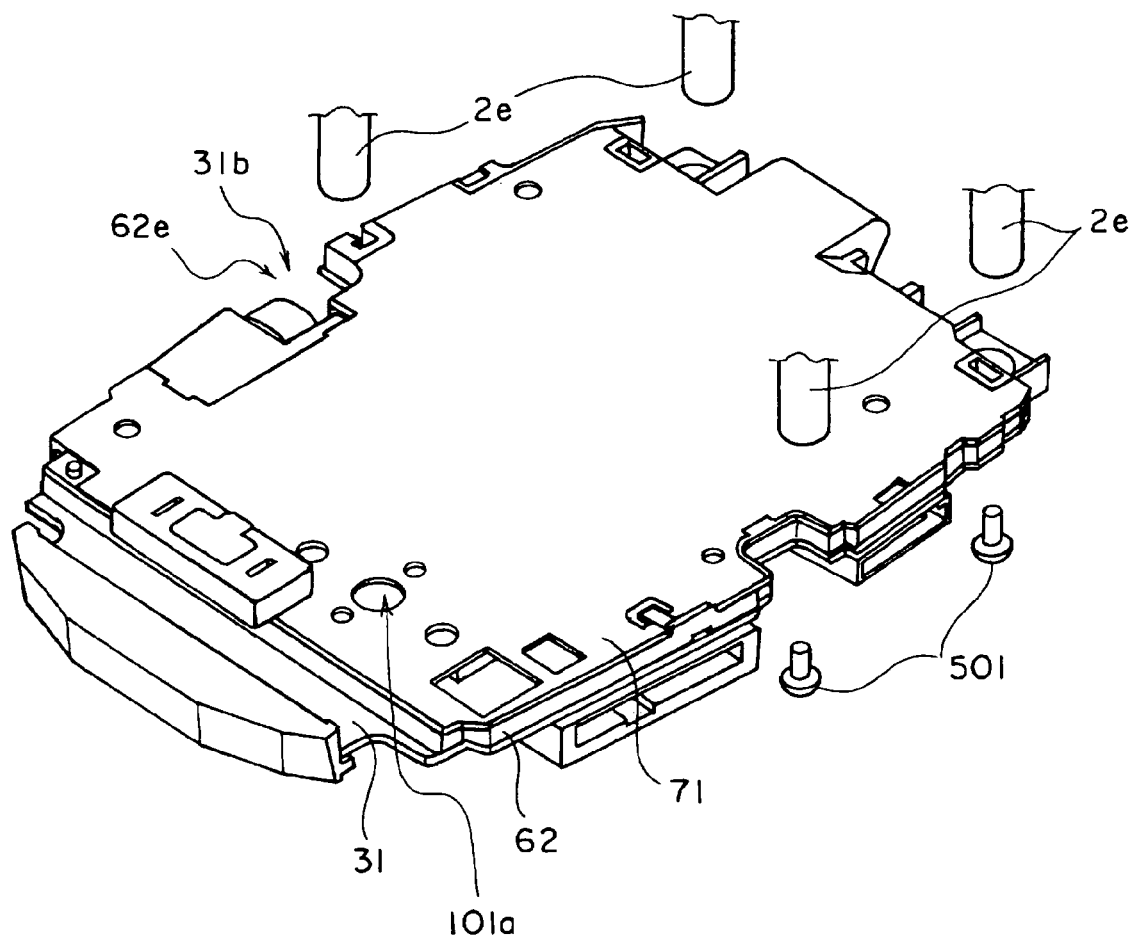
FIG. 14 is a disassembled perspective view of the configuration of the inside of the first housing of the mobile phone of the present embodiment.

FIG. 13 and FIG. 14 are disassembled perspective views showing the configuration of a portion inside the first housing 2. In FIG. 13, the left side of the sheet surface is the connection side of the first housing 2, and the upper side of the sheet surface is the back surface of the first housing 2. In FIG. 14, they are horizontally and vertically reversed from FIG. 13.

On the front surface (lower side of the sheet surface) of the circuit board 31, various types of circuits such as the high frequency circuit 61 are arranged. A shield case (shield body) 62 for shielding against electromagnetic waves emitted from the circuits or entering from the outside is placed over that. Further, a flexible circuit board 71 is arranged on the shield case 62.

The shield case 62 is provided with a plate 62a, partition walls 62b provided on the periphery and inside of the plate 62a and sectioning the plate 62a, a microphone holder 62c for holding the microphone 12 constituting the electric signal/audio converting portion, and screw bosses 62d provided adjacent to the microphone holder 62c.

The circuit board 31 and the shield case 62 are fixed by fastening screws 500 in the screw bosses 62d via holes 31a from the back surface of the circuit board 31. Further, the front surface case 2c and the back surface case 2d are fixed by fastening screws 501 penetrating through the back surface case 2d with screw bosses 2e provided on the back side of the front surface case 2c. The circuit board 31 and the shield case 62 are provided with recesses 31b and 62e in which the screw bosses 2e is fit. The circuit board 31 and the shield case 62 are also fixed to each other by fixing the front surface side case 2c and the back surface side case 2d. Note that, the shield case 62 is formed from plastic plated on its surface to have conductivity. The shield case 62 is fixed to the ground line of the circuit board 31 in the conductive state.

Figure 15A:
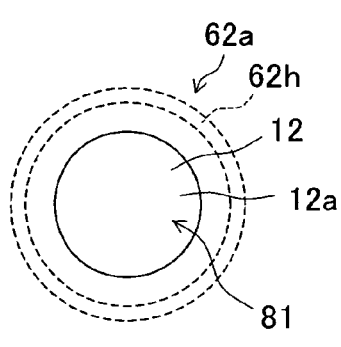
FIGS. 15A to 15C are plan views of the vicinity of a microphone of the mobile phone of the present embodiment.
Figure 15B:
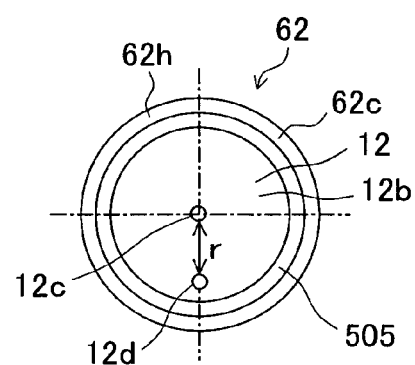
Figure 15C:
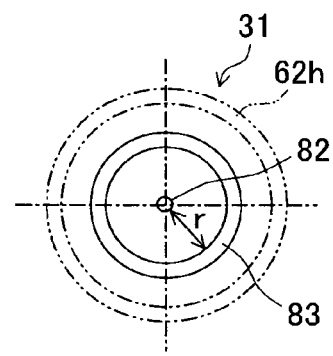

FIG. 15A is a view of the microphone holder 62c and the microphone 12 from the front surface of the first housing 2 (lower side of the sheet surface of FIG. 13), FIG. 15B is a view of the microphone holder 62c and the microphone 12 from the back surface of the first housing 2, and FIG. 15C is a view of the position of the circuit board 31 facing the microphone holder unit 62c.

The microphone 12 is formed in a columnar shape having a sound collection unit 12a and an electrode 12b on its ends. On the other hand, the microphone holder 62c has a wall 62h formed into a cylindrical shape of a size able to receive the microphone 12. The wall 62h continues from the partition wall 62b and is substantially the same as the partition wall 62b in both of the thickness and height (refer to FIG. 13). Note that, the partition walls 62b are provided for the purpose of isolating circuits of the circuit board 31 from each other or reinforcing the structural strength of the shield case 62.

The microphone 12 is fit with a packing 505 formed by an elastic member such as rubber, then fitted in the microphone holder 62c from the sound collection unit 12a side and fixed to the microphone holder 62c. Further, by fixing the circuit board 31 and the shield case 62 to each other as explained above, the microphone 12 is sandwiched between the plate 62a of the shield case 62 on the sound collection unit 12a side having a vibration plate vibrating and converting audio to an electric signal and the circuit board 31 on the electrode 12b side. Note that the outer diameter of the microphone 12 and the inner diameter of the microphone holder 62c may be set so that the microphone 12 can be directly fit and fixed in the microphone holder 62c without the packing 505. An elastic member such as rubber may be arranged between the sound collection unit 12a and the plate 62a.

The plate 62a in the microphone holder 62c of the shield case 62 is provided with an opening 81 having a smaller inner diameter than the outer diameter of the microphone 12. Note that the opening 81 may be appropriately set in its shape and size so long as it can support the microphone 12 from the sound collection unit side.

The electrode 12b of the microphone 12 is provided with a first contact 12c at the center of the electrode 12b and a second contact 12d at a position separated from the first contact 12c by exactly a distance r. On the other hand, the circuit board 31 is provided with a third contact 82 at the center of the position facing the microphone holder 62c and a fourth contact 83 on the circumference of the radius r centered around the third contact 82. When the microphone 12 is sandwiched between the circuit board 31 and the shield case 62, the first contact 12c contacts the third contact 82, and the second contact 12d contacts the fourth contact 83. Note that the fourth contact 83 need not be a full circumferential shape so long as it is separated from the third contact 82 by the distance r. If the microphone 12 shown as the columnar shape has a rotary symmetric shape with respect to the third contact 82 such as a regular quadratic prism, fourth contacts may be provided at positions facing the second contact 12d corresponding to each of orientations in which the microphone 12 can be fit in the microphone holder 62c. This is consequently not different from the provision of a fourth contact 83 on a circumference having the radius r.

Figure 16:
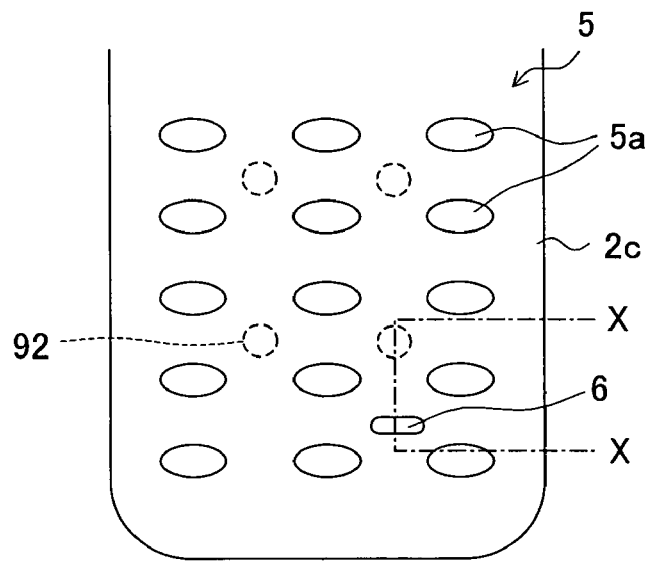
FIG. 16 is a plan view of a operation unit of a mobile phone of the present embodiment.
Figure 17:
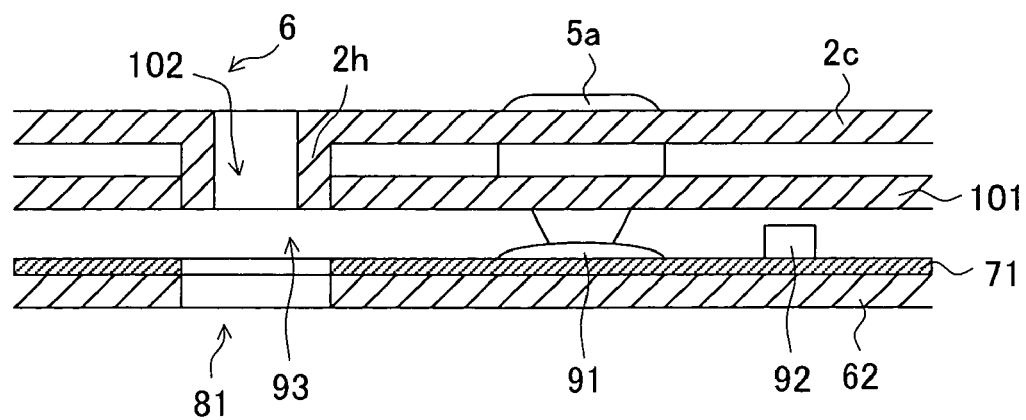
FIG. 17 is a sectional view taken along a line X-X of FIG. 16 showing the operation unit of a mobile phone of the present embodiment.

FIG. 16 is a plan view of a operation unit 5, and FIG. 17 is a sectional view taken along a line X-X of FIG. 16. Note that, in FIG. 17, only the upper side from the shield case 6 is shown.

As shown in FIG. 17, the flexible circuit board 71 has depression switches 91 arranged corresponding to the keys of the operation unit 5 such as the tenkeys 5a and opening/closing the contacts in accordance with a depression operation and light emitting elements 92 for illuminating the keys of the operation unit 5. A key sheet 101 having the keys of the operation unit 5 and a front surface cover 2c are arranged over that. Note that the tenkeys 5a are formed by for example a plastic able to pass light therethrough.

The flexible circuit board 71, the key sheet 101, and the front surface cover 2c 2b are provided with openings 93, 102, and 6 at positions corresponding to the openings 81 of the shield case 62. The front surface cover 2c is provided with a wall portion 2h extending cylindrically from edges of an opening 6 to the key sheet 101 side and inserted into the opening 102 of the key sheet 101. The wall portion 2h may be provided at the entire circumference of the opening 6 or provided at only the side where the light emitting element 92 is arranged.

As shown in FIG. 16, the tenkeys 5a are arranged vertically in three columns, and light emitting elements 92 are arranged between adjacent columns. The light emitting elements 92 are arranged between the columns at every other tenkey 5a. The opening 6 is provided at one position where no light emitting element 92 is arranged among positions among four tenkeys 5a.

Figure 18:
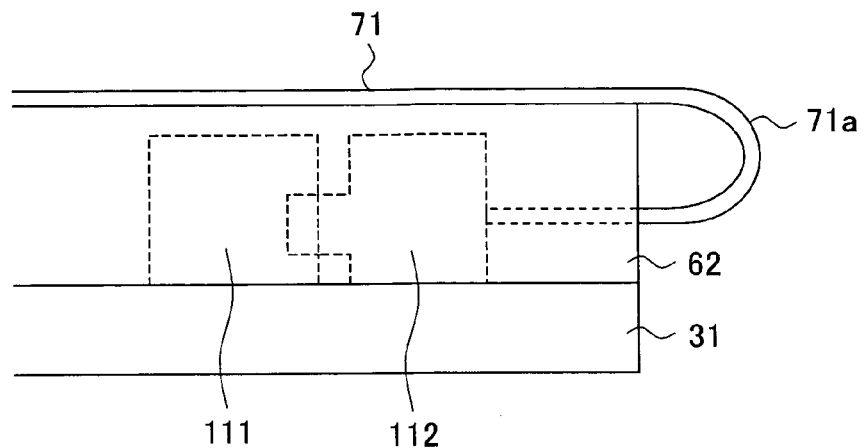
FIG. 18 is a side view of a conducting portion of a flexible circuit board of a mobile phone of the present embodiment.

As shown in FIG. 18, the flexible circuit board 71 is provided with a tongue piece 71a protruding outwardly from the shield case 62 and a connector 112 provided at the tongue piece 71a. By folding the tongue piece 71a and connecting the connector 112 with a connector 111 provided on the circuit board 31, the flexible circuit board 71.and the circuit board 31 are electrically connected.

Figure 19:
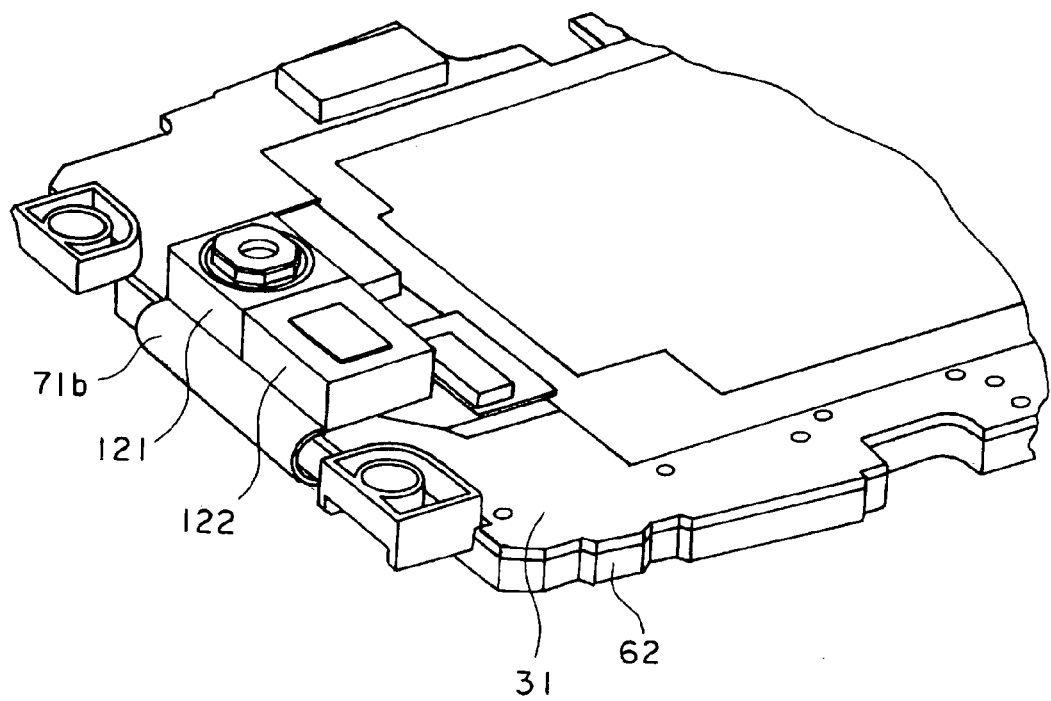
FIG. 19 is a perspective view of a camera module of a mobile phone of the present embodiment.

As shown in FIG. 19, the back surface of the circuit board 31 (upper side of the sheet surface) is provided with a camera module (electronic device) 121 and a light emitting device (electronic device) 122 for flash. The camera module 121 and the light emitting device 122 are electrically connected to a folded tongue piece 71b provided at the end of the flexible circuit board 71. The camera module 121 and the light emitting device 122 are controlled by the circuits of the flexible circuit board 71 or circuits of other boards via the flexible circuit board.

Figure 20A:
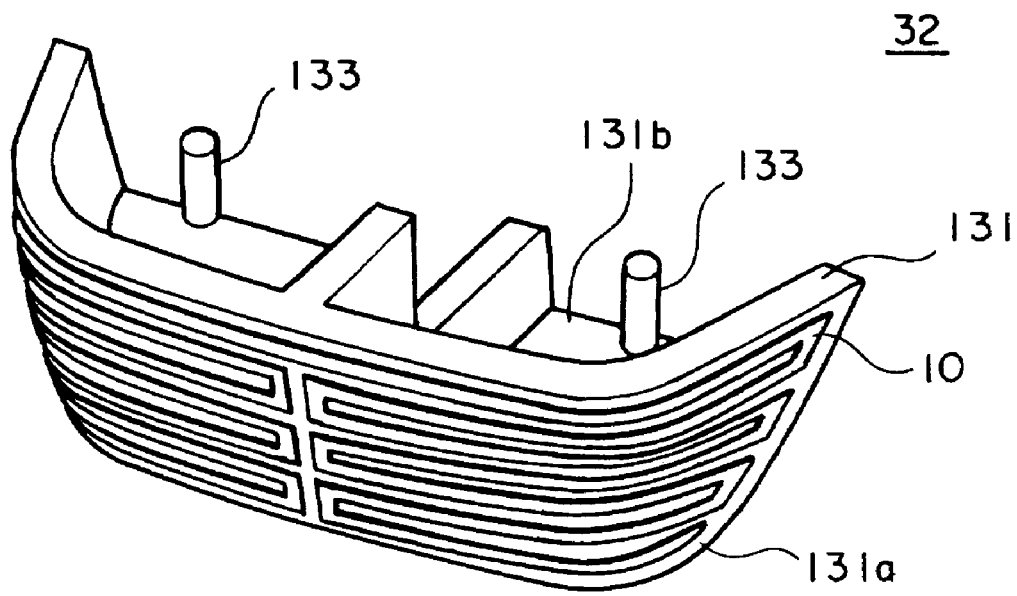
FIG. 20A and FIG. 20B are views of an antenna unit of a mobile phone of the present embodiment.
Figure 20B:
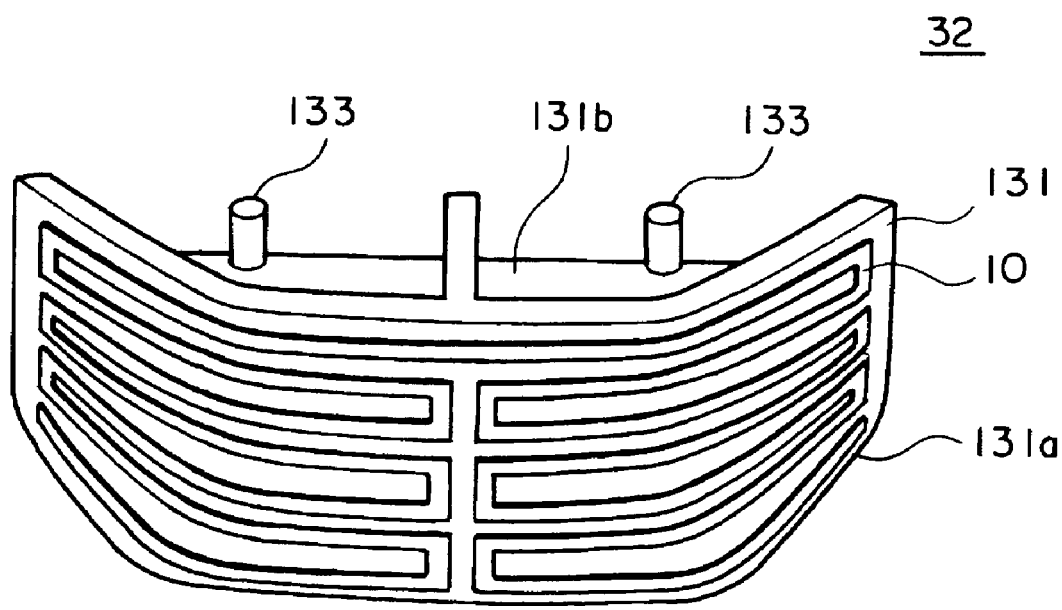

FIG. 20A is a perspective view of the antenna unit 32 seen from the same direction as FIG. 10, while FIG. 20B is a view of the antenna unit 32 seen from a little above the opening/closing side of the first housing 2. The antenna unit 32 is provided with a base 131 attached to the circuit board 31, an antenna 10 arranged in the base 131, and a power supply terminal 133 for supplying power to the antenna 10.

The base 131 is formed by a plastic or other nonconductive member and has a curved surface 131a facing the inner wall of the end 2b of the first housing 2 (refer to FIG. 1) and a frame portion 131b provided inside the curved surface 131a. The curved surface 131a is formed as a curved surface facing from the direction on the back surface of the first housing 2 to the direction of the opening/closing side and protruding to the opening/closing side when seen from the back surface and is arranged at the outside of the shield case 62.

The frame portion 131b is formed so as to abut against the back surface and opening/closing end of the circuit board 31. At a position facing the back surface of the circuit board 31, a power supply terminal 133 is provided. The power supply terminal 133 is electrically connected to a power supply terminal 134 (refer to FIG. 13) provided on the back surface of the circuit board 31.

The antenna 10 is comprised of sheet metal of phosphorus bronze etc. formed to a predetermined pattern and is arranged so as to cover the entire curved surface 131a. Note that since the antenna 10 is arranged over the entire curved surface 131a and the projection of the antenna 10 when seen from the front surface of the first housing 2 substantially coincides with the projection of the antenna unit 32, the description of the arrangement of the antenna unit 32 in the explanation of FIG. 10 and FIG. 11 may be regarded as the description of the arrangement of the antenna 10.

According to the mobile phone 1 explained above, in the closed state, elements having a relatively small influence on the antenna characteristics are arranged near the antenna 10, while elements having a relatively large influence on the antenna characteristics are arranged away from the antenna 10, therefore the influence of the second housing 3 on the antenna characteristics in the closed state is reduced in comparison with a mobile phone in the related art.

That is, even when the sub display unit 8 is arranged at a position overlapping the antenna 10 and the antenna 10 is provided inside the end 2b of the first housing 2, interference can be reduced as much as possible in the sub display unit 8 and the antenna 10, so the space inside the end 3b of the second housing 3 facing this can be effectively utilized. In other words, the degree of freedom in design is improved. For example, the sub display unit 8 can be arranged on the end 3b side while forming the outer shapes of the housings 2 and 3 so that the open/close ends 2b and 3b coincide with each other.

Since the back surface of the sub display holder 51 is provided abutting against the back surface of the main display frame 42, the sub display holder 51 is stably fixed, and the structural strength of the sub display holder 51 is reinforced by the main display frame 42.

Since the drive unit 52 is provided at the tongue piece 51b, in comparison with the case where the drive unit is provided on the flexible circuit board connected to the sub display unit as in the past case, work becomes easier, for example the flexible circuit board is not turned over in the production process. Further, the degree of freedom of the three-dimensional layout of the parts is improved.

Since the depression switch 53 is provided on the tongue piece 51b, the distance between the back surface of the second housing 3 and the depression switch 53 is short. Accordingly, even when the thickness of the housing is a little large, it is not necessary to make the pushbutton 9 thick with respect to the depression direction or make the depression switch 53 bulker. Further, the tongue piece 51b is provided at a position not overlapping the antenna 10, therefore the possibility of the user's hand depressing the pushbutton 9 influencing the characteristics of the antenna 10 is low.

Since the sub display unit 8 is rounded at the portion overlapping the antenna 10, the influence of the sub display unit 8 on the characteristics of the antenna 10 is greatly reduced.

The wireless communication terminal of the present invention is not limited to the above embodiments and can be worked in various other ways. For example, in the present embodiment, an example where the antenna 10 was provided in the first housing 2 and the reactance element was arranged between the speaker 11 and the audio processing unit 16 provided in the second housing 3 facing each other in the closed state was shown, but when arranging the antenna 10 in the second housing 3, even if the reactance element is arranged between the microphone 12 and the audio processing unit 16 provided in the first housing 2 facing each other in the closed state, the same actions and effects as those of the present embodiment can be exhibited.

The open/closeable wireless communication terminal is not limited to the fold up type as in the present embodiment. It is sufficient so far as the housings can move relative to each other between the closed state where two or more housings are superimposed on each other and the opened state where at least parts of portions facing each other in the closed state are exposed. Accordingly, for example, it includes also a terminal in which the first housing and second housing are slid relative to each other by parallel movement or rotational movement to be opened and closed.

The base against which the back surface of the first display unit abuts may be constituted by only members holding the first display unit or may include members attached to those members as well. Note that, in the above embodiment, the main display unit holder 41 and the main display frame 42 correspond to the base of the present invention.

So long as the second display unit is provided over the base body, the second display unit per se may abut against the base or the holder holding the second display unit may abut against the base. Further, the shape and size of the portion abutting against the base are not limited. Note that, preferably, as in the above embodiment, the portion abuts with the surface over a predetermined area (for example an area of half or more of the second display unit).

The shield body is not limited to the case shape. For example, it may be a sheet shape not having partition walls as well.

It should be understood by those skilled in the art that various modifications, combinations, sub-combinations and alterations may occur depending on design requirements and other factors insofar as they are within the scope of the appended claims or the equivalents thereof.

I claim:

1. A wireless communication terminal comprising:
   a first housing;
   a second housing connected to the first housing so that the housings open and close with respect to each other;
   an antenna arranged in one housing of the first housing and second housing;
   an electric signal/audio converting portion arranged in the other housing of the first housing and second housing; and
   an audio processing unit for performing audio processing of the electric signal/audio converting portion, wherein
   the antenna is arranged facing the vicinity of the electric signal/audio converting portion when the first housing and second housing are in the closed state and is arranged away from the electric signal/audio converting portion when the housings are in the opened state, and
   a matching circuit for matching an impedance of the antenna is arranged between the audio processing unit and the electric signal/audio converting portion,
   wherein the terminal further comprises:
   an open/close detection unit for detecting whether the first housing and second housing are in the opened state or the closed state,
   a first signal line connected to the electric signal/audio converting portion and having the matching circuit arranged therein,
   a second signal line connected to the electric signal/audio converting portion and not having the matching circuit arranged therein, and
   a switch unit for switching a signal line connected to the audio processing unit between the first signal line and the second signal line, and
   the switch unit switches the signal line based on detection results of the opening/closing detection unit.

2. A wireless communication terminal as set forth in claim 1, wherein the matching circuit is set so as to operate when the first housing and second housing are in the closed state.

3. A wireless communication terminal as set forth in claim 1, wherein the matching circuit is set so as to operate with respect to a communication frequency bandwidth and not operate with respect to an audio frequency bandwidth.

4. A wireless communication terminal as set forth in claim 1, wherein the matching circuit is set so as to operate when the first housing and second housing are in the closed state.

5. A wireless communication terminal as set forth in claim 1, wherein the matching circuit is set so as to operate with respect to a communication frequency bandwidth and not operate with respect to an audio frequency bandwidth.

* * * * *